US011692480B2

(12) United States Patent
Bellet et al.

(10) Patent No.: US 11,692,480 B2
(45) Date of Patent: Jul. 4, 2023

(54) AIR INTAKE SCOOP FOR AN AIRCRAFT

(71) Applicant: Safran Nacelles, Gonfreville L'Orcher (FR)

(72) Inventors: François Bellet, Moissy Cramayel (FR); Laurent Georges Valleroy, Moissy Cramayel (FR); Mathieu David, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 885 days.

(21) Appl. No.: 16/552,516

(22) Filed: Aug. 27, 2019

(65) Prior Publication Data
US 2020/0063659 A1 Feb. 27, 2020

(30) Foreign Application Priority Data
Aug. 27, 2018 (FR) ...................................... 18/57685

(51) Int. Cl.
*F02C 7/05* (2006.01)
*B60H 1/30* (2006.01)
*F02C 7/18* (2006.01)
*B64D 33/08* (2006.01)

(52) U.S. Cl.
CPC .................. *F02C 7/05* (2013.01); *F02C 7/18* (2013.01); *B60H 1/30* (2013.01); *B64D 33/08* (2013.01); *F05D 2230/53* (2013.01)

(58) Field of Classification Search
CPC .. F01D 25/14; F02C 7/04; F02C 7/052; F02C 7/055; F02C 7/05; B60H 1/30; B64D 2033/0246
See application file for complete search history.

(56) References Cited

U.S. PATENT DOCUMENTS

| 2,940,692 | A | * | 6/1960 | Ward | F02C 7/20 60/262 |
|---|---|---|---|---|---|
| 3,521,431 | A | * | 7/1970 | Buckley | F02C 7/052 55/306 |
| 6,050,527 | A | * | 4/2000 | Hebert | B64C 23/00 244/209 |
| 2008/0016844 | A1 | * | 1/2008 | Shutrump | F02K 3/02 60/226.1 |
| 2014/0202170 | A1 | * | 7/2014 | Cook, III | C23C 18/165 427/404 |

FOREIGN PATENT DOCUMENTS

| FR | 2879563 | 6/2006 |
| FR | 2879564 | 6/2006 |
| WO | 2013068671 | 5/2013 |

* cited by examiner

*Primary Examiner* — Todd E Manahan
*Assistant Examiner* — Sean V Meiller
(74) *Attorney, Agent, or Firm* — Burris Law, PLLC

(57) ABSTRACT

An air intake scoop intended to be fastened on a panel of an aircraft includes an air inlet mouth having a wall, a peripheral collar intended to be fastened to the panel, and a bearing element intended to support the air circulation duct. The air inlet mouth is made of a thermoplastic material and the bearing element is fastened on the peripheral collar so as to achieve a pressure barrier in case of breakage of the wall of the air inlet mouth.

16 Claims, 1 Drawing Sheet

AIR INTAKE SCOOP FOR AN AIRCRAFT

CROSS-REFERENCE TO RELATED APPLICATIONS

This application claims priority to and the benefit of FR 18/57685 filed on Aug. 27, 2018. The disclosure of the above application is incorporated herein by reference.

FIELD

The present disclosure relates to an air intake scoop, and more particularly an air intake scoop for an aircraft nacelle.

BACKGROUND

The statements in this section merely provide background information related to the present disclosure and may not constitute prior art.

In general, air intake scoops are devices allowing diverting an air flow so as to use this air flow for example for cooling of an equipment.

There are two types of air intake scoops, dynamic scoops and static scoops.

The dynamic scoops have an opening projecting in the area of the air flow to be drawn so as to capture the air flow in the opening in order to direct it in the desired area. On the contrary, the static scoops have a non-projecting opening so as to ensure the aerodynamics of the structure including the scoop. It is a pressure differential between the air intake area and the area in which the air flow is intended to be directed that allows drawing the air in the case of static scoops.

An aircraft is propelled by at least one propulsion unit including a turbojet engine housed within a nacelle generally having a tubular structure comprising an air inlet at the front of the turbojet engine, a middle section intended to surround a fan of the turbojet engine, a rear section intended to surround the combustion chamber of the turbojet engine and which may accommodate thrust reversal means.

Modern nacelles are often intended to accommodate a bypass turbojet engine capable of generating, a hot air flow, called primary air flow.

A nacelle generally comprises an outer structure comprising the air inlet, the middle section and the rear section, and an inner structure concentric with the rear section, called Inner Fixed Structure (IFS) surrounding the core of the turbojet engine at the rear of the fan. These outer and inner structures define a flow annular channel, also called secondary flow path, aiming at channeling a cold air flow, called secondary air flow, which circulates outside the turbojet engine.

The middle section of the nacelle may also be called fan casing cowl, whereas the rear section may also be called thrust reverser, or sliding cowl in the case where it is capable of sliding longitudinally.

The rear structure of the core of the turbojet engine terminates in a nozzle, called primary nozzle, ensuring the ejection of the hot air primary flow. In turn, the outer structure of the nacelle generally terminates in a nozzle, called secondary nozzle, which may have a variable section and optimizing the ejection of the cold air secondary flow.

Thus, the inner structure of the nacelle constitutes a cowling around the core of the turbojet engine and may be referred to by different names, in particular Aft Core Cowl (ACC).

The static air intake scoop for an aircraft nacelle is intended to draw a cold air flow coming from the secondary flow path in order to channel it in a duct for cooling of the turbine of the turbojet engine.

This type of air intake scoop is intended to be fastened by bolting on the inner face of the inner fixed structure of an aircraft nacelle, at an orifice of this inner fixed structure, and includes, in a known manner, an air inlet mouth having a wall intended to open radially, preferably at an angle facilitating the entry of an air flow into the scoop, in the turbojet engine of the aircraft. The scoop further has a peripheral collar which surrounds the air inlet mouth at its end intended to be fastened to the inner fixed structure, the scoop being fastened to the inner fixed structure via this collar. The collar and the wall of the scoop are integrally made in one piece. A duct is intended to be fastened to this scoop, at the side opposite to the collar, via an interface plate fastened to said duct and by a bearing plate fastened on the wall of the air inlet mouth of the scoop, a seal being disposed between the interface and bearing plates. The interface and bearing plates are substantially parallel to the collar of the scoop.

Thus, a portion of the air flow coming from the secondary flow path of the nacelle is diverted into the scoop and then into the duct, thanks to a pressure differential between the secondary flow path and the duct.

At the junction area between the scoop and the duct, a portion of the diverted air flow tends to escape and seep into a space between the seal, the interface plate and the bearing plate, which has the effect of increasing the pressure in said space.

In order to avoid cracks at the bearing plate, which would result in air flow leakages, said plate is usually made of materials resistant to the pressure generated in the space between the seal and the interface and bearing plates.

Furthermore, the wall of the scoop may be subjected to cracks, for example caused by impacts of debris or caused by the pressure of the air flow during its diversion into the scoop. In order to avoid these cracks which may result in air leakages, said wall is also made of materials resistant to these impacts and to high pressures.

Thus, such scoops have both an aerodynamic function and a sealing function.

By aerodynamic function, is meant a function of diverting the air flow; and by sealing function, is meant a pressure barrier function.

For example, the materials resistant to pressure and resistant to impacts are composite materials such as epoxy carbon, or metals such as carbon, aluminum, titanium or alloys.

The drawbacks of these types of materials lie in that they are costly and difficult to implement for the manufacture of scoops. Thus, the manufacturing costs are quite considerable.

SUMMARY

The present disclosure provides an air intake scoop intended to be fastened on a panel of an aircraft, at an orifice of this panel and to an air circulation duct, said scoop including:

an air inlet mouth having a wall intended to project from one side of the panel opposite to the air to be drawn;

a peripheral collar located at one end of the air inlet mouth intended to be fastened to the panel; and a bearing element intended to support the air circulation duct, characterized in that the air inlet mouth is made of a thermoplastic material and the bearing element is fastened on the peripheral collar so as to achieve a pressure barrier in case of breakage of the wall of the air inlet mouth, thus inhibiting air flow leakages.

Thus, the manufacturing costs of the air intake scoop are reduced in comparison with those of the prior art because of the ease of implementation of thermoplastic materials and because of the lower cost of these materials.

Furthermore, the aerodynamic and sealing functions of the scoop according to the present disclosure are separated: the air inlet mouth made of a thermoplastic material has an aerodynamic function whereas the bearing element has a sealing function.

According to other features of the present disclosure, the air intake scoop of the present disclosure includes one or more of the following optional features considered alone or according to any possible combination thereof.

According to one feature, the peripheral collar surrounds the air inlet mouth.

According to another feature, the bearing element is concentric with the air inlet mouth.

Advantageously, the bearing element includes a bearing plate intended to support the air circulation duct, via a seal for example.

The bearing plate is substantially parallel to the collar.

According to one feature, the bearing element includes a base fastened to the collar so as to achieve the pressure barrier in case of breakage of the wall of the air inlet mouth.

In one form, the base of the bearing element is L-shaped and comprises one branch fastened to the collar, parallel to said collar, and one other branch allowing achieving the pressure barrier in case of breakage of the wall of the air inlet mouth.

According to this feature, the branch fastened to the collar is, in one example, turned towards the direction opposite to the air inlet mouth.

Advantageously, the bearing element includes stiffeners.

In the form according to which the bearing element includes an L-shaped base, the stiffeners are disposed between the bearing plate and the branch of the base fastened to the collar, said stiffeners being substantially perpendicular to said plate and said branch.

These stiffeners allow stiffening the pressure barrier, and transmitting the compressive forces of the seal.

In another form, the base and the bearing plate are integrally made in one piece.

According to one feature, the scoop is a static scoop.

According to another feature, the air inlet mouth and the collar are integrally made in one piece.

According to one form, the bearing element is also made of a thermoplastic material.

Alternatively, the bearing element is made of a composite material, of carbon or of a metal, combined with the thermoplastic matrix material.

In another form, the used thermoplastic materials are flexible materials such as polyamide, Polyethylene terephthalate or else Polyoxymethylene, among others.

In yet another form, the wall is adapted to facilitate the entry of an air flow into the scoop and aerodynamic continuity.

To this end, the wall extends the collar by a curved line.

The present disclosure further concerns an inner fixed structure of an aircraft nacelle including a scoop as previously described.

The present disclosure also concerns an aircraft nacelle including a scoop as previously described.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
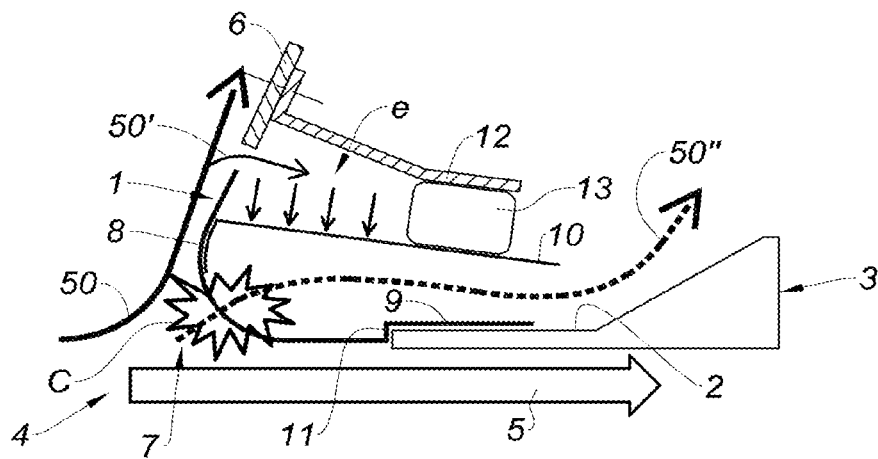
FIG. 1 is a schematic partial view illustrating a static air intake scoop fastened on the inner face of an inner fixed structure of an aircraft nacelle according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 represents an air intake scoop 1 of the prior art fastened by bolting (not represented), by its proximal end, on the inner face 2 of an inner fixed structure 3 of an aircraft nacelle, said inner fixed structure 3 defining, together with an outer structure (not represented), a flow annular channel 4, also called secondary flow path, in which a cold air flow 5, called secondary air flow, circulates, said scoop 1 being further fastened, by its distal end, to a duct 6 intended to open into a turbojet engine (not represented) of the aircraft.

The scoop 1 is fastened, by its proximal end, at an orifice 7 of the inner fixed structure 3.

The scoop 1 allows drawing an air flow 50, called drawn air flow, coming from the cold air flow 5 of the secondary flow path 4.

The drawn air flow 50 is then channeled in the duct 6 for cooling the turbine of the turbojet engine.

The scoop 1 is made of materials resistant to pressure and to impacts, such as composite materials like epoxy carbon, or metals like carbon, aluminum, titanium or alloys.

The scoop 1 according to the prior art includes an air inlet mouth 8 projecting at the inner face 2 side of the inner fixed structure 3, a peripheral collar 9 which surrounds the air inlet mouth 8 at its proximal end with respect to the inner fixed structure 3, and a bearing element 10 fastened on the air inlet mouth 8 of the scoop 1 and intended to support the duct 6.

The scoop 1 is fastened to the inner face 2 of the inner fixed structure 3 by the peripheral collar 9.

The air inlet mouth 8 has a free distal end flush with the duct 6.

The air inlet mouth 8 has a shape facilitating the entry of the drawn air flow 50 into the scoop 1, and provides aerodynamic continuity between the inner fixed structure 3 and the scoop 1.

The aerodynamic continuity between the inner fixed structure 3 and the scoop 1 is provided by a step 11 with a height substantially identical to the thickness of the inner fixed structure 3, present at the juncture between the peripheral collar 9 and the air inlet mouth 8.

The entry of air into the scoop is facilitated by the curved shape of the air inlet mouth 8.

The peripheral collar 9 and the air inlet mouth 8 are made integrally in one piece.

The bearing element 10 enables fastening of the scoop 1 to the duct 6.

To this end, the duct 6 includes an interface element 12 which cooperates with the bearing element 10 via a seal 13.

The bearing 10 and interface 12 elements are substantially parallel to the peripheral collar 9 of the scoop 1.

At the junction area between the scoop 1 and the duct 6, a portion 50' of the diverted air flow 50 tends to escape and seep into a space "e" between the interface element 12, the seal 13, and the bearing element 10, which has the effect of increasing the pressure in said space "e."

The bearing element 10 of the scoop 1 then achieves a tight barrier allowing inhibiting leakages of the drawn air flow 50.

Moreover, the air inlet mouth 8 being subjected to impacts of debris and to high pressures of the diverted air flow, the pressure and impacts resistant materials composing the scoop, allow reducing the risk of cracks C, and at the same time air leakages 50" through the wall of the air inlet mouth 8 of the scoop 1.

Figure 2:
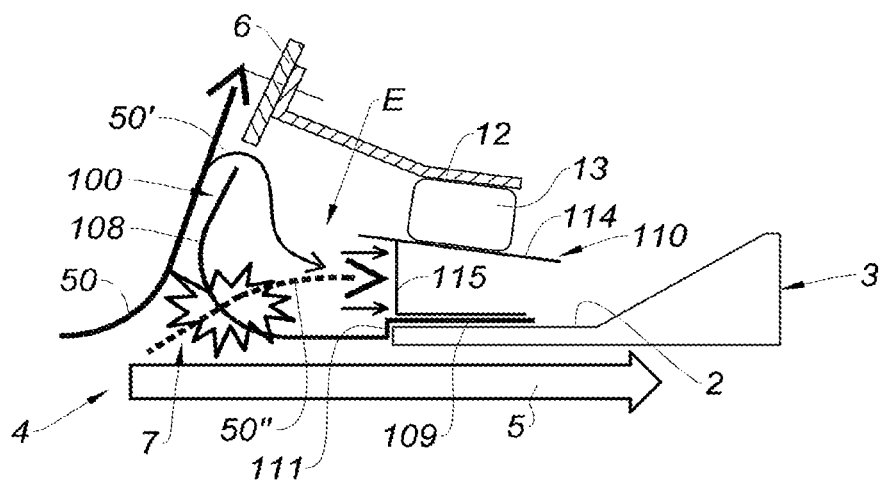
FIG. 2 is a schematic partial view illustrating an air intake scoop fastened on the inner face of an inner fixed structure of an aircraft nacelle according to the present disclosure.

FIG. 2 represents an air intake scoop 100 according to the present disclosure, fastened by bolting (not represented), by its proximal end, on the inner face 2 of an inner fixed structure 3 of an aircraft nacelle, said inner fixed structure 3 defining, together with an outer structure (not represented), a flow annular channel 4, also called secondary flow path, in which a cold air flow 5, called secondary air flow, circulates, said scoop 100 being further fastened, by its distal end, to a duct 6 intended to open into a turbojet engine (not represented) of the aircraft.

The scoop 100 is fastened, by its proximal end, at an orifice 7 of the inner fixed structure 3.

The scoop 100 allows drawing an air flow 50, called drawn air flow, coming from the cold air flow 5 of the secondary flow path 4.

The drawn air flow 50 is then channeled in the duct 6 for cooling the turbine of the turbojet engine.

The scoop 100 includes an air inlet mouth 108 projecting at the inner face 2 side of the inner fixed structure 3, a peripheral collar 109 which surrounds the air inlet mouth 108 at its proximal end with respect to the inner fixed structure 3, and a bearing element 110 fastened on the peripheral collar 109 and intended to support the duct 6.

The scoop 100 is fastened to the inner face 2 of the inner fixed structure 3 by the peripheral collar 109.

The air inlet mouth 108 has a free distal end flush with the duct 6.

The air inlet mouth 108 is made of a thermoplastic material such as polyamide, Polyethylene terephthalate or else Polyoxymethylene, among others.

The air inlet mouth 108 has a shape facilitating the entry of the drawn air flow 50 into the scoop 100, and provides aerodynamic continuity between the inner fixed structure 3 and the scoop 100.

The aerodynamic continuity between the inner fixed structure 3 and the scoop 100 is provided by a step 111 with a height substantially identical to the thickness of the inner fixed structure 3, present at the juncture between the peripheral collar 109 and the air inlet mouth 108.

The entry of air into the scoop is facilitated by the curved shape of the air inlet mouth 108.

In one form, the peripheral collar 109 and the air inlet mouth 108 are integrally made in one piece.

The bearing element 110 enables tight junction of the duct 6 to the scoop 100.

The bearing element 110 enables fastening of the scoop 100 to the duct 6.

To this end, the duct 6 includes an interface element 12 which cooperates with the bearing element 110 via a seal 13.

The bearing element 110 is concentric with the air inlet mouth 108.

The bearing element 110 advantageously includes a bearing plate 114 substantially parallel to the peripheral collar 109, the bearing plate 114 being intended to support the duct 6, via the seal 13.

The bearing element further includes an L-shaped base 115 a first branch of which is fastened to the peripheral collar 109, parallel to said collar 109, and the second branch of which allows linking the first branch to the bearing plate 114.

In one form, the base 115 and the bearing plate 110 are integrally made in one piece.

At the junction area between the scoop 100 and the duct 6, a portion 50' of the diverted air flow 50 tends to escape and seep into a space E between the interface element 12, the seal 13, and the bearing element 110, and the air inlet mouth 108, which has the effect of increasing the pressure in said space E.

The second branch of the base 115 of the bearing element 110 of the scoop 100 then achieves a tight barrier allowing inhibiting leakages of the drawn air flow 50.

Moreover, the air inlet mouth 108 being subjected to impacts of debris and to high pressures of the diverted air flow, cracks C may appear in its wall, and at the same time air leakages 50". The second branch of the base 115 of the bearing element 110 of the scoop 100 then achieves a tight barrier allowing avoiding air flow leakages.

The bearing element 110 is made of materials resistant to the forces generated by the pressure, such as reinforced thermoplastic materials such as for example polyether ether ketone, polyamide reinforced with glass, carbon, aramid fibers or any other metallic alloy like aluminum or titanium reinforcements.

Figure 3:
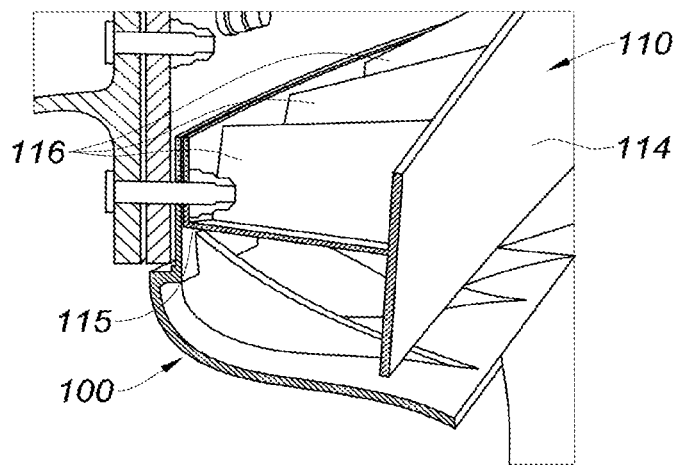
FIG. 3 is a schematic sectional view of a scoop including stiffeners according to the present disclosure.

According to one form, the bearing element 110 is reinforced by stiffeners 116 (FIG. 3).

The first branch of the base 115 of the bearing element 110 is turned towards the direction opposite to the air inlet mouth 108.

FIG. 3 represents one form of a scoop 100 according to the present disclosure including stiffeners 116 disposed between the bearing plate 114 and the base 115 of the bearing element 110.

The stiffeners 116 are substantially perpendicular to the bearing plate 114.

The stiffeners 116 allow stiffening the bearing element 110, and thus consolidating the sealing barrier.

The stiffeners 116 also allow transmitting the compressive forces of the seal 13 (FIG. 2).

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An air intake scoop fastened at an orifice of a panel of an aircraft and to an air circulation duct and configured to draw an air flow, the air intake scoop comprising:
    an air inlet mouth having a wall projecting from one side of the panel opposite the drawn air flow;
    a peripheral collar located at one end of the air inlet mouth, the peripheral collar separate from the panel and fastened to the panel; and
    a bearing element separate from the peripheral collar, the bearing element supporting the air circulation duct and extending along the peripheral collar away from the air inlet mouth,
    wherein the air inlet mouth, the air circulation duct, the bearing element and the peripheral collar jointly define a space therein, and
    wherein the air inlet mouth is made of a thermoplastic material and the bearing element is fastened on the peripheral collar such that a pressure barrier is formed by the bearing element between the peripheral collar and the air circulation duct.

2. The air intake scoop according to claim 1, wherein the bearing element includes a bearing plate supporting the air circulation duct.

3. The air intake scoop according to claim 2 further comprising a seal disposed between the bearing plate and the air circulation duct.

4. The air intake scoop according to claim 1, wherein the bearing element includes a base fastened to the peripheral collar to form the pressure barrier.

5. The air intake scoop according to claim 4, wherein the base of the bearing element is L-shaped and comprises a first branch fastened to and parallel to the peripheral collar, and a second branch that forms the pressure barrier.

6. The air intake scoop according to claim 1, wherein the bearing element includes stiffeners.

7. The air intake scoop according to claim 6, wherein the stiffeners are disposed between a bearing plate of the bearing element and a first branch of a base of the bearing element fastened to the peripheral collar, the stiffeners being perpendicular to the bearing plate and the first branch of the base.

8. The scoop according to claim 1, wherein the air inlet mouth and the peripheral collar are integrally made in one piece.

9. The scoop according to claim 1, wherein the bearing element is made of a thermoplastic material.

10. An inner fixed structure of an aircraft nacelle including an air intake scoop according to claim 1.

11. An aircraft nacelle including an air intake scoop according to claim 1.

12. An air intake scoop fastened at an orifice of a panel of an aircraft and to an air circulation duct and configured to draw an air flow, the air intake scoop comprising:
    an air inlet mouth having a proximal end defining a wall projecting from one side of the panel opposite the drawn air flow and a distal free end disposed away from the proximal end;
    a peripheral collar located at the proximal end of the air inlet mouth, the peripheral collar separate from the panel and fastened to the panel; and
    a bearing element separate from the peripheral collar, the bearing element supporting the air circulation duct and extending along the peripheral collar away from the air inlet mouth,
    wherein the air inlet mouth, the air circulation duct, the bearing element and the peripheral collar jointly define a space therein, the distal free end extending toward an end of the air circulation duct to be flush with the end of the air circulation duct,
    wherein the air inlet mouth is made of a thermoplastic material and the bearing element is fastened on the peripheral collar such that a pressure barrier is formed by the bearing element between the peripheral collar and the air circulation duct.

13. The scoop according to claim 12, further comprising a seal disposed between the air circulation duct and the bearing element to jointly define the space with the air inlet mouth, the air circulation duct, the bearing element and the peripheral collar.

14. The scoop according to claim 12, wherein the bearing element includes a first branch fastened to and parallel to the peripheral collar and a second branch extending from the first branch toward the air circulation duct to form the pressure barrier.

15. The scoop according to claim 12, wherein an air leakage through a junction area between the air circulation duct and the distal free end of the air inlet mouth is blocked by the bearing element and contained in the space.

16. The scoop according to claim 12, wherein the distal free end of the air inlet mouth is fastened to the air circulation duct.

* * * * *